United States Patent [19]

Dellinger et al.

[11] Patent Number: 4,473,265
[45] Date of Patent: Sep. 25, 1984

[54] SURFACE MOUNTED SHIELDED TELEPHONE JACK

[75] Inventors: Thomas A. Dellinger, North Richland Hills; Clifton G. Hampton, Bedford, both of Tex.

[73] Assignee: Siecor Corporation, Hickory, N.C.

[21] Appl. No.: 374,009

[22] Filed: May 3, 1982

[51] Int. Cl.³ .......................................... H01R 13/44
[52] U.S. Cl. .................................. 339/39; 339/116 C
[58] Field of Search ........... 339/36, 39, 116 R, 116 C, 339/122 R

[56] References Cited

U.S. PATENT DOCUMENTS

| 3,656,083 | 4/1972 | Brook | 339/39 |
| 4,093,331 | 6/1978 | Molchan | 339/39 |
| 4,288,684 | 9/1981 | Katou et al. | 339/36 X |

Primary Examiner—Z. R. Bilinsky
Attorney, Agent, or Firm—Roy B. Moffit

[57] ABSTRACT

A telephone jack composed of three basic elements: an open top cylindrically shaped cover means; a cylindrically shaped jack housing containing a jack, the jack housing being coaxially received in and rotatably engaged with the cover means; and a biasing means, one portion of which is in engagement with the cover means and another portion in engagement with the jack housing.

11 Claims, 12 Drawing Figures

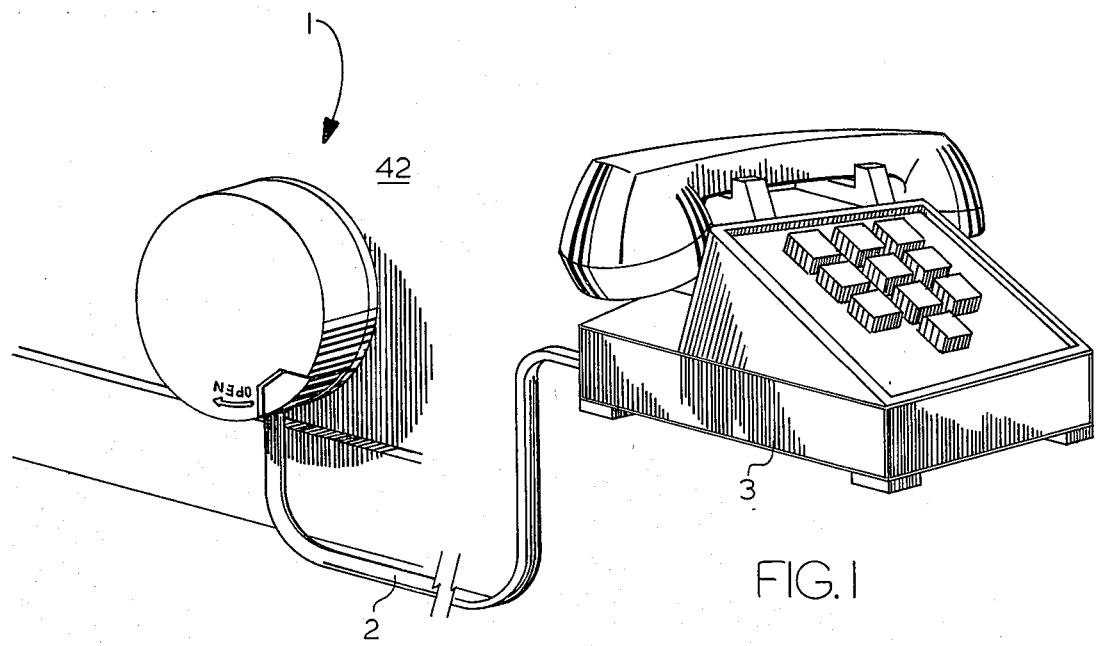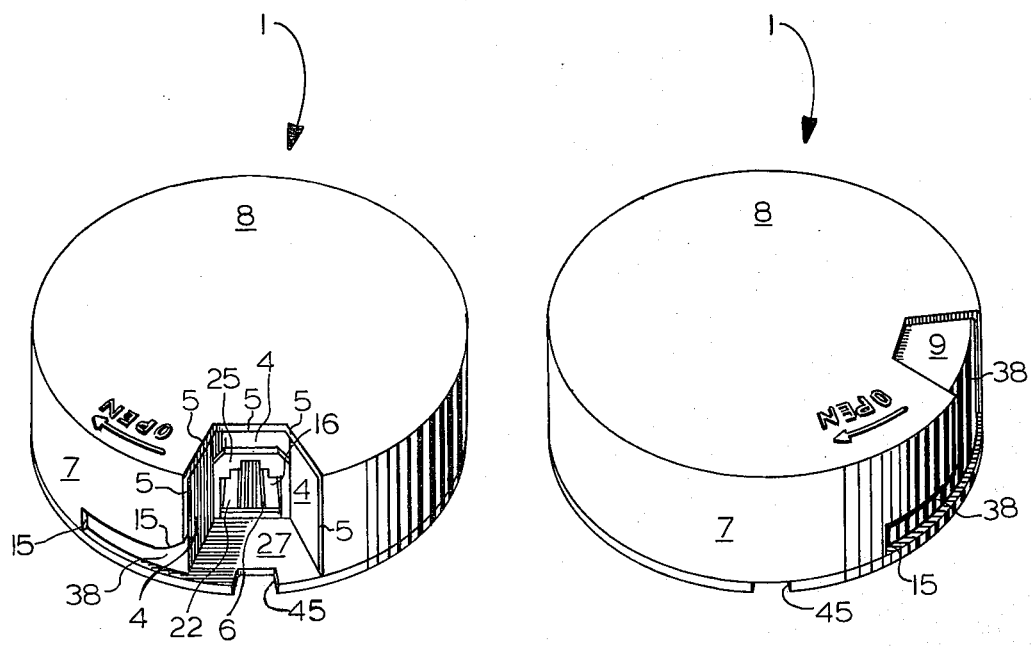

SURFACE MOUNTED SHIELDED TELEPHONE JACK

BACKGROUND OF THE INVENTION

1. Field of the Invention

This invention relates to the field of electrical connectors adapted to be used in a telephone transmission system having multiple contacts.

The direction of present day telephone technology is towards the "modular apparatus" concept, particularly that portion of telephone technology that deals with the telephone system between trunk telephone line and the individual subscriber's handset, more particularly telephone handsets, cords, wall jacks or receptacles. Most equipment of this nature can be simply and easily plugged into one another to form electrical connection with a telephone transmission pair and can be easily removed from such a connection and transported into another location and re-connected to the same or another telephone transmission pair, all without the aid of a skilled telephone repairman. Examples of so-called modular apparatus (jacks and plugs) of this nature are described in U.S. Pat. Nos. 3,990,764; 3,850,497 and 4,188,082; the disclosure of which are hereby incorporated by reference as if they were faithfully reproduced.

Plugs and jacks as presently used in modern day telephone "modular apparatus" arrangements usually have a plurality of contacts, which in most cases are gold plated in order to enhance the electrical path made by this contact. Such contacts, if not protected from the outside environment, have a tendency to become coated with grease, grime, dust and other particles, which increase the attenuation of the circuit and reduce the effectiveness of the plug and jack arrangement. This problem is identified and discussed in U.S. Pat. No. 4,188,082 and, in a general sense, this invention addresses the same problem.

2. Description of Prior Art

The most relevant prior art relating to the telephone wall jack of the instant invention known to the applicants' is a modular jack cover manufactured by Western Electric Company and Suttle Apparatus Corporation of Lawrenceville, Ill., both having a product designation of 625S. This jack cover is basically a three piece composit, comprising a jack housing, a jack and a gate or cover. The jack housing is rectilinear in shape, the jack being exposed on one surface thereof. The jack housing cover is rotatably affixed to a portion of the surface of the jack housing cover in a biased position covering the exposed jack. Exposure of the jack cavity is accomplished by rotating the cover.

The disclosed invention, like that of the relevant above described prior art, facilitates the connection of a telephone handset to the transmission pair of a telephone system, and is usually mounted flush on the lower third of a wall. Connection of a telephone handset to the telephone transmission pair is achieved in a manner well known in the art, e.g., by means of drop wire from the transmission pair to a building, inside wire from the inside wire to a jack and a line cord from the jack to the telephone handset. A line cord is a cord containing a transmission pair and terminated on at least one end by a modular connector, sometimes called a plug; usually both ends are terminated by a modular connector. The jack portion is a cavity into which the modular connector is slidably insertable to make an electrical connection with the telephone transmission pair to which the other terminal end of the line cord is connected to the telephone handset in a like manner.

Most surface mounted telephone jacks of the type to which this invention relates are designed to be installed at the bottom third of the wall, i.e., within the first three feet above the floor. Because such wall jacks are exposed, i.e., open receptacles or cavities, it has been found that dust, grime, mop water, grease, along with condensation, tend to collect in the connector cavity, all of which increase the attenuation of the connection, thereby producing undesirable transmission results. Furthermore, a jack cavity saturated with water will smolder and possibly catch on fire when ringing voltage is applied to a connector inserted in it. Consequently, anything that can be done to close off the wall jack cavity from the elements of the room is a step forward.

Because such wall jacks are usually installed in the bottom third of a wall and because such jacks are in communication with the interior of the wall, if left uncovered, they have a tendency to experience a "chimney effect." This chimney effect is referred to in U.S. Pat. No. 4,188,082 and is understood to be convection air currents moving from a usually warm room into the connector cavity and thereafter into a colder wall cavity behind the telephone jack. These currents of air carry dust particles, water vapor and the like and tend to move from the room into the jack cavity, over the electrical contacts and wiring used in the jack housing to make electrical connections and out the back side of the housing into the wall cavity itself. This so-called "chimney effect" not only has a tendency to bring into the connector cavity and in contact with electrical components undesirable particulate matter such as dust, dirt, grease and the like but also tends to deposit water condensate on the electrical components in the connector cavity, because of the temperature change of the air from a warm room temperature to a colder temperature existing in the wall cavity itself. It is towards this solution of the above identified problems that this invention is directed.

SUMMARY OF THE INVENTION

The surface mounted shielded telephone jack of the instant invention lends itself to the "modular concept" in vogue today in the telephone industry. Telephone transmission lines that are connected to station or inside wires are normally connected to the rear portion of the wall jack by screws or other conventional or well-known means. In turn, the station wires are thus placed in electrical connection with a dielectric carrier which is in mechanical engagement with the flush mounted wall jack. The dielectric carrier has a plurality of spring contacts, which are in electrical communication with the station wire and in electrical communication with the telephone transmission pair. Spring contacts of the dielectric carrier protrude into a connector-receiving cavity, which is adapted to receive a male plug or connector and this male plug or connector has a plurality of electrical contacts, adapted to be in electrical connection with the spring contacts of the dielectric carrier. As previously described, the plug is in electrical communication with a telephone handset cord, which is in ultimate electrical communication with a telephone handset, completing a communication circuit. Such an arrangement is shown in U.S. Pat. Nos. 4,040,699; 3,761,861; 3,761,869 and 4,188,082 to which reference is made for other details.

Three parts, a cylindrically shaped open top cover means, a cylindrically shaped jack housing in which a jack is disposed, the jack housing being coaxially received in and rotatably engaged with the cover means, and a biasing means, one portion of which is in engagement with the cover means and another portion in engagement with the jack housing, comprise the instant invention. Such an arrangement provides a cylindrically shaped jack housing and cover which, in its biased position, is closed, and upon rotating the cover, an opening in the side wall of the jack housing is exposed by a first opening in the side wall of the cover. This first opening is in communication with a second opening, adapted to receive the line cord itself and in communication with the jack cavity. Once the jack housing cover is rotated to expose the opening in its side wall and thus the jack cavity, a plug or connector can be inserted into the cavity to form the electrical communication necessary for the transmission system. Then the biased jack housing cover can then be released. It rotates so that the line cord is received in the second opening and the connector in the jack is effectively covered by the side wall of the cover means. When the plug is removed from the cavity, the biasing means causes the jack housing cover to rotate to its fullest extent, such rotation causing the side wall of the cylindrical shaped jack housing cover means to cover the jack cavity. The jack housing cover remains closed until rotated again to expose the opening. Rotating of the jack housing cover to cover the jack cavity results in a significant reduction in the chimney effect because it acts as a damper in the same manner as a damper would act on a stove.

BRIEF DESCRIPTION OF THE DRAWINGS

FIG. 1 is a pictorial representation of the surface mounted shielded telephone jack mounted on a wall and in electrical communication with the telephone handset.

FIG. 2 is an isometric view of the telephone wall jack of FIG. 1 in its closed position;

FIG. 3 is an isometric view of the telephone wall jack of FIG. 1 in its open position;

DESCRIPTION OF THE PREFERRED EMBODIMENT

Shown in FIG. 1 is wall jack 1 of the instant invention in electrical communication, by means of line cord 2, with a telephone handset 3. Telephone wall jack 1 is attached to the lower third of wall 42 in a manner well known in the art. Line cord 2 is terminated by a modular connector sometimes called a plug and is generally of the type described in U.S. Pat. No. 3,761,869, the contents of which are referred to for more particulars as if faithfully reproduced herein. The modular connector is attached to one or both terminals of line cord 2 and slips into the female cavity of the jack 1 and a like cavity in telephone handset 3, in the manner as disclosed in the such Patent.

Figure 5:
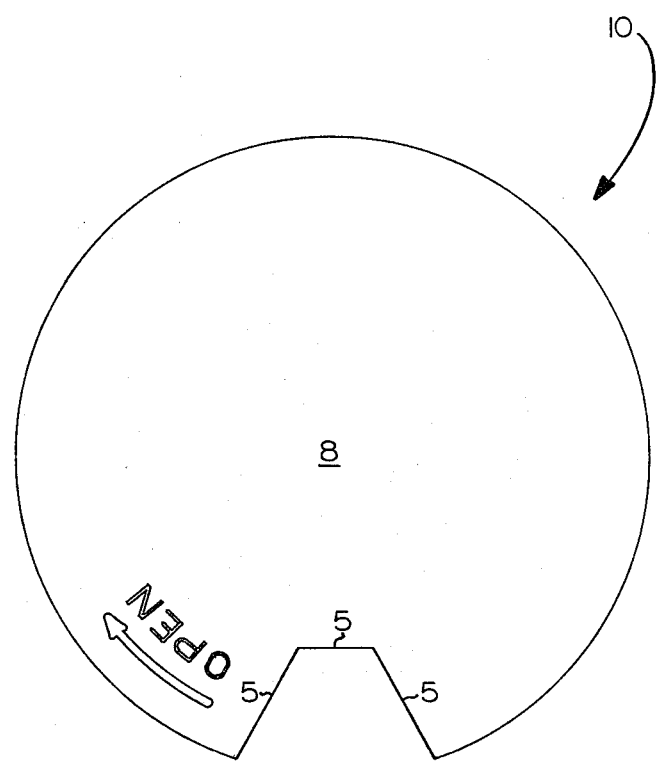
FIG. 5 is a plan view of the outer surface of the cover of FIG. 4.
Figure 7:
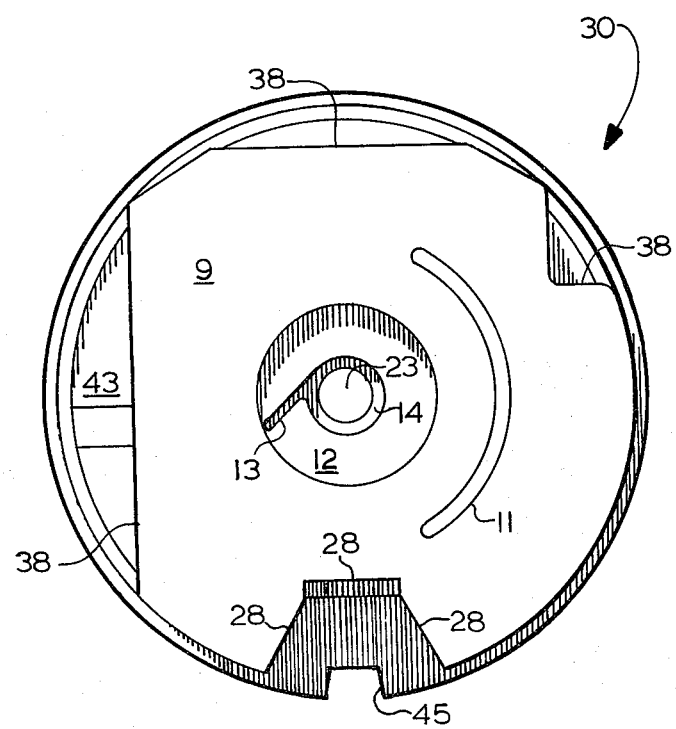
FIG. 7 is a plan view of the outer surface of the jack housing of FIG. 6.
Figure 8:
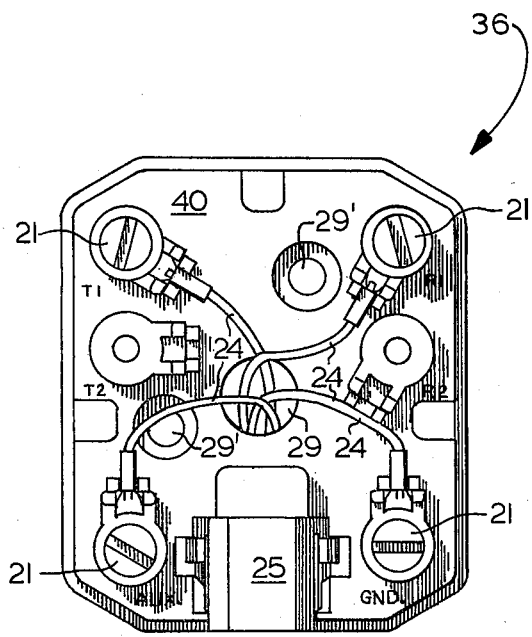
FIG. 8 is a plan view of the inner surface jack adapted to be housed in the jack housing of FIGS. 6 and 7.
Figure 9:
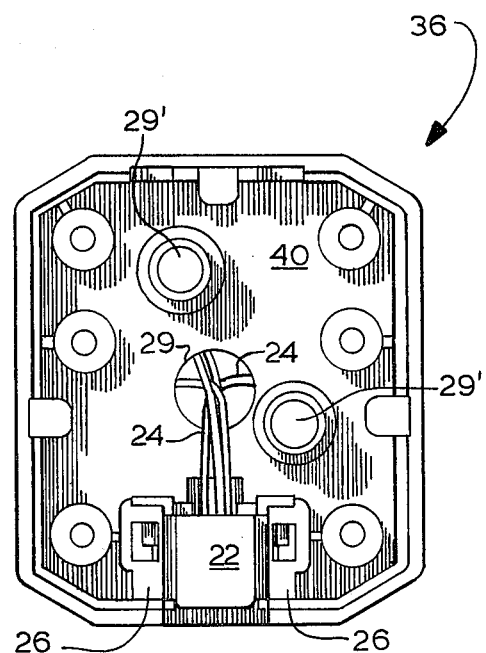
FIG. 9 is a plan view of the reverse outer surface of the jack of FIG. 8.

A cover means composed of a circular top 8 and side wall 7 disposed around its periphery is shown in FIGS. 2 and 3. See also FIG. 5, which is a plan view of top 8. Element 5 identifies the free edges of a first opening in the side walls 7 and cover means top 8. In communication with ths first cavity is a second cavity delineated by free edges 15, the second cavity being smaller than the first cavity. The first cavity is adapted to be in alignment with a cavity in side wall 38 of a cylindrically shaped jack top housing composed of a top portion 30 (FIGS. 6 and 7) and bottom portion 36 (FIGS. 8 and 9). Top portion 30 is composed of side wall 38 and flange portion 43. In side wall 38, there is a cavity defined by the terminal free edges 28 of side walls 4. This cavity communicates with another cavity defined by the side wall 25, and dielectric carrier 22, shaped to receive a modular plug. The bottom portion of this last mentioned cavity is formed by dielectric carrier 22, similar to that as shown in U.S. Pat. No. 4,188,082. See element 10 of FIG. 3 of this patent. This dielectric carrier has metal tangs 6 fitted into slots disposed in the rear portion of a jack.

Referring to FIG. 3, the jack housing itself (a combination of elements 30 and 36) is biased relative to the cover means 10 so that one can be rotated relative to the other from the closed unbiased position shown in FIG. 2 to the biased position of FIG. 3. More particularly, rotation in the direction indicated by the arrow of FIGS. 2 and 3 causes alignment of the first cavity in side wall 7, defined by free edges 5, the cavity defined by faces 4 and 27 with the cavity defined by side wall 25 and dielectric carrier 22. The modular plug (not shown) that terminates line cord 2 is inserted into such cavity to form the necessary electrical connection. After the electrical connection is completed, cover 10 is released. Biasing means 31 causes elements 10, 30 and 36 to realign themselves in the configuration of FIGS. 1 and 2. In FIG. 1 the line cord 2 slides into the cavity formed by terminal free edges 15, thus, effectively closing off a good portion of the otherwise exposed jack and modular connector (now shown).

Figure 11:
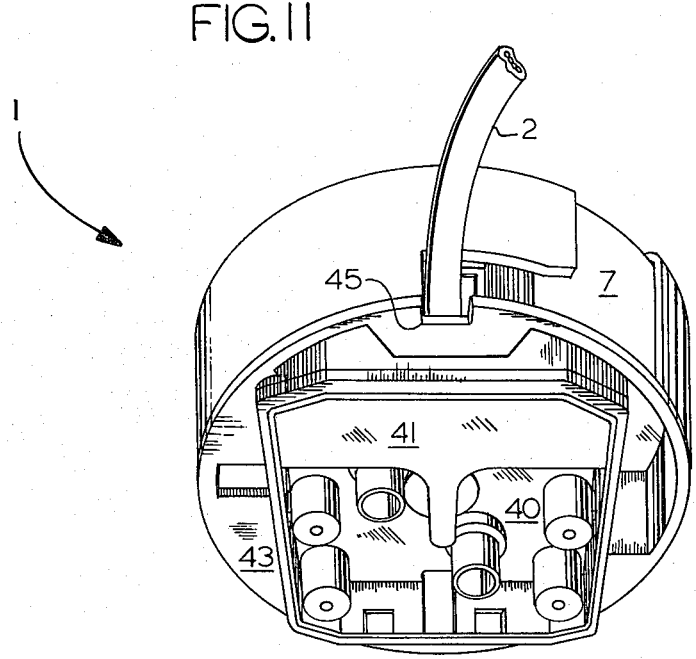
FIG. 11 is an isometric view of the wall jack of FIG. 2 in its closed position showing one possible position of line cord.
Figure 12:
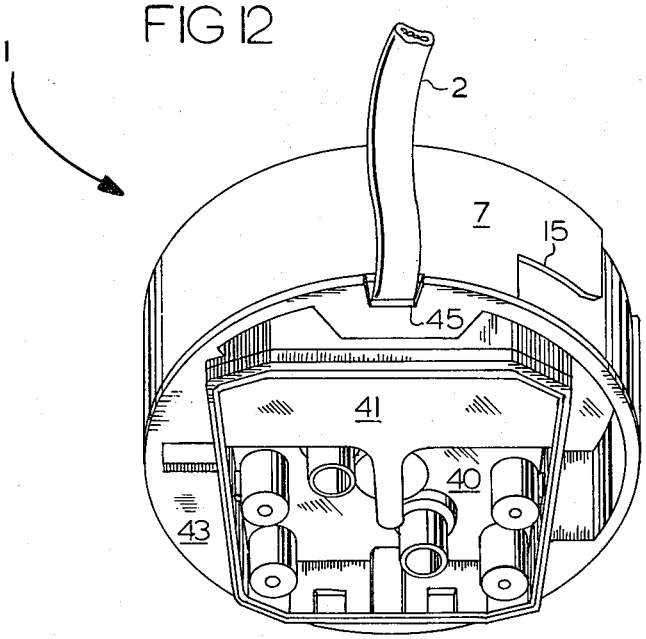
FIG. 12 is an isometric view of the wall jack shown in FIG. 10 in its other closed position.

Shown in FIGS. 11 and 12 are the two possible positions the telephone line cord 2 may take when the wall jack 1 is in a closed position mode. Line cord 2 is terminated by a modular connector (not shown) and inserted in cavity 16 while the wall jack is in the open position as shown in FIG. 3. Subsequently, cover means 10 is released and cover 10 and line cord 2 take one of two possible positions, shown in FIGS. 11 and 12. If line cord 2 is fitted in slot 45 in flange 27, then the configuration of FIG. 12 is achieved. In this position, biasing means 31 rotates cover 10 until stop means 17 is at an extremity of slot 11. If line cord 2 assumes the position shown in FIG. 11, then cover 10 is rotated only partially through the traverse permissible by the coaction of stop means 17, slot 11 and biasing means 31.

Figure 4:
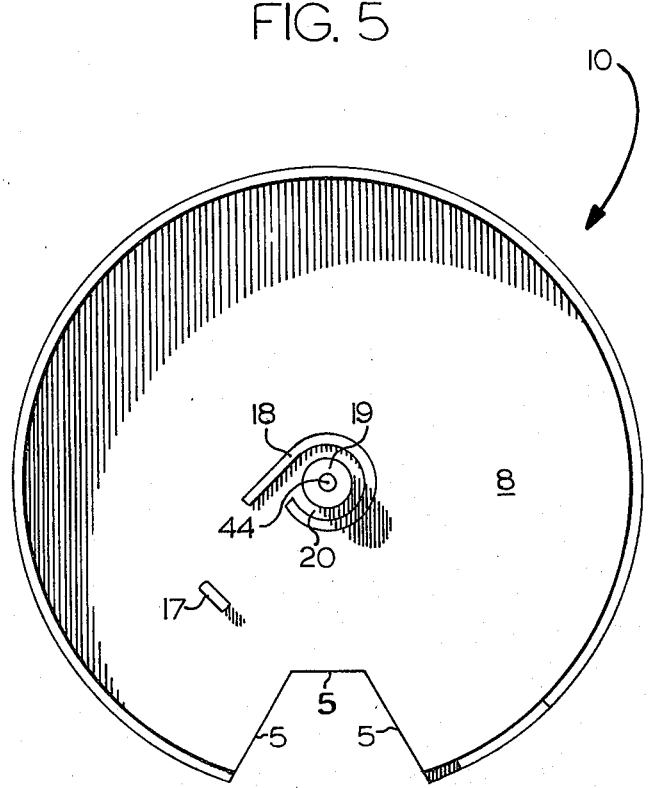
FIG. 4 is a plan view of the inner surface of a cylindrically shaped cover of the wall jack of FIG. 1.

Cover means 10 on its underside (FIG. 4) has an upstanding stop means 17 disposed on surface 8' of circular top 8. Also disposed on underside 8' is upstanding post 19 and a wall 18, partially circumscribing post 19, thereby forming cavity 20 between post 19 and wall 18. The purpose of stop means 17 is to coact with and fit into, in a slidable and rotatable fashion, slot 11 of jack housing top 9. Slot 11 is so designed so that when stop means 17 is engaged in it and rotated to one limit, wall jack 1 is in its open (biased) position as shown in FIG. 3 and when stop means 17 is rotated to the other limit of slot 11, wall jack 1 is in its closed configuration as shown in FIGS. 1 and 2.

In the center of top 9 there is a first cavity 12 which circumscribes a second cavity 14. Cavity 14 is in communication with and tangential to a third cavity 13. A terminal portion of post 19 of cover means 10 is received in and rests upon the bottom of cavity 14. The function of cavity 12 is to receive upstanding wall 18 and allow rotation of cover means 10 to the extent limited by the terminal portions of slot 11 coming into engagement with stop means 17. The purpose of cavities 13 and 14 is to receive terminal portion 32 of spring 31 and in like fashion, the purpose of cavity 20 is to receive, in a restricting relationship, the other terminal portion 43 of spring 33. The coiled portion 33 of spring 31 is coaxially disposed around post 19. Side wall 38 connects top portion 9 with bottom portion 43 and flange 27. Free edges 28 delimit the intersection of faces 4 with side wall 38 and faces 4, in combination with flange 27 define a cavity in side wall 38 through which a modular connector is passed on to its way to being engaged in the cavity formed by dielectric carrier 22 and side wall 25. Cover means 10 is a cover for jack top housing top portion 30. Jack top housing element bottom portion 36 is frictionally engaged with top portion 30 in the arrangement shown in FIG. 10, in a manner well known in the art, and this combination is coaxially received in and rotatably engaged with cover means 10.

Figure 6:
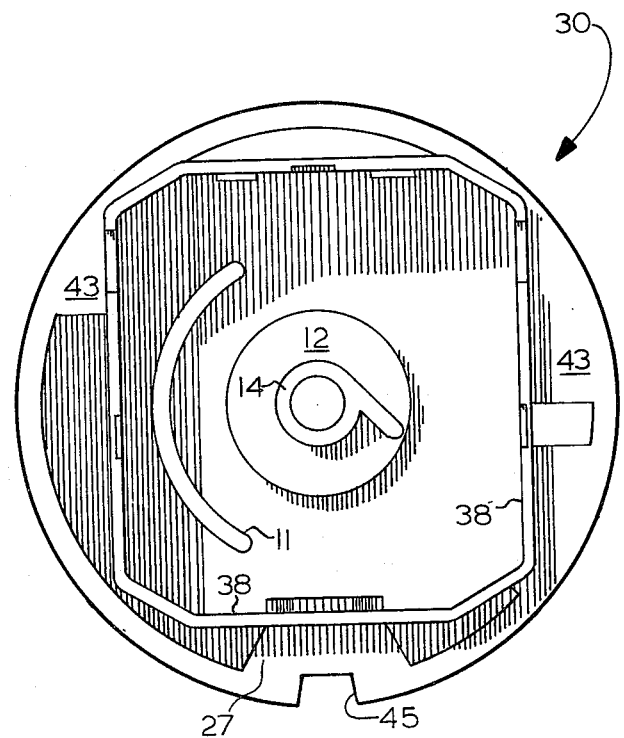
FIG. 6 is a plan view of the inner surface of a cylindrically shaped jack housing.

The underside of the top portion 30 is show in FIG. 6. Element 13' is the bottom of cavity 13, 12' the bottom of cavity 12 and 14' the bottom of cavity 14. Element 9' is the under surface of top 9, which is integral with side wall 38, which in turn is integral with skirt 43 and flange 27.

Figure 10:
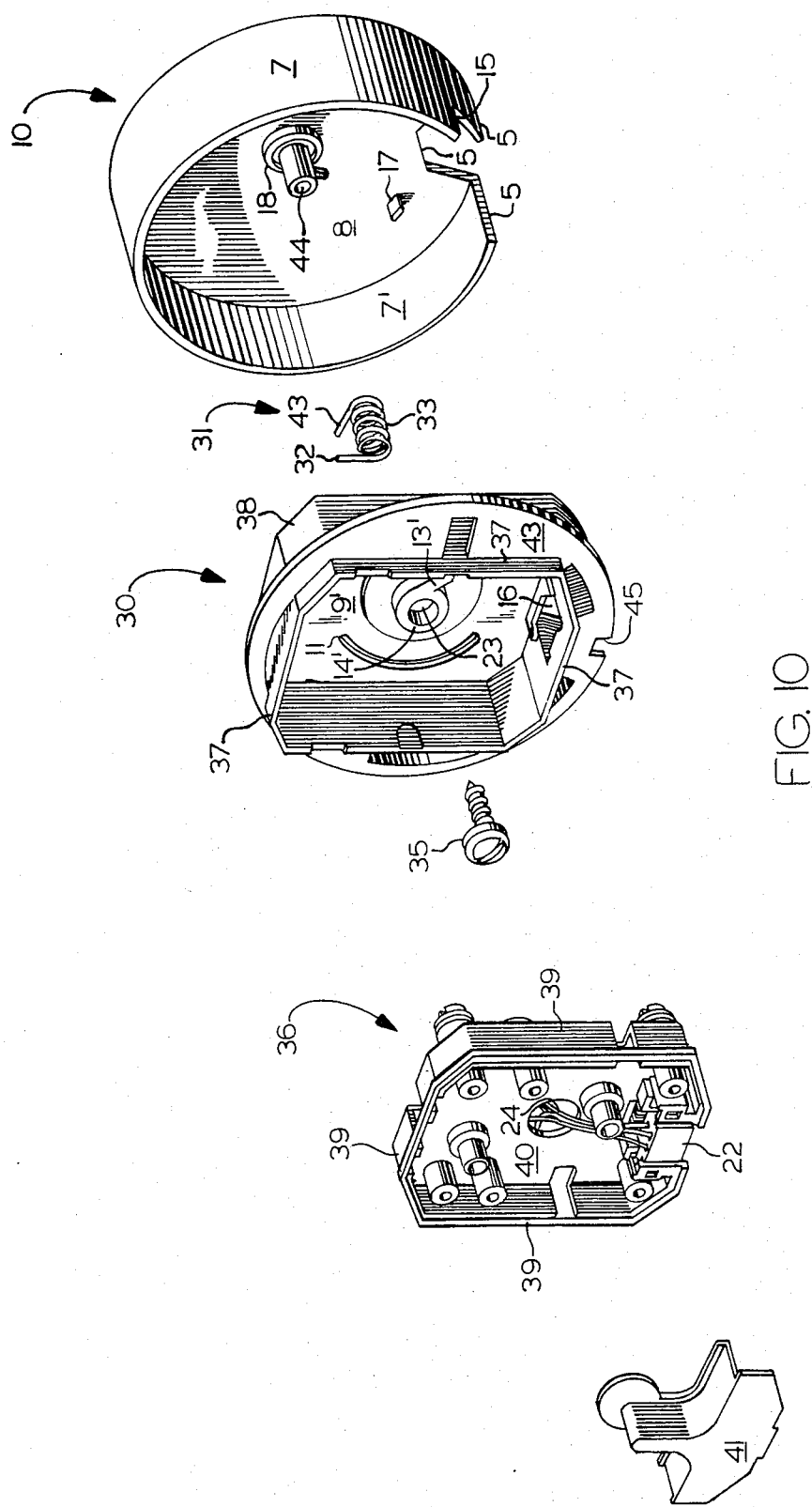
FIG. 10 is an isometric perspective illustrating how the jack of FIGS. 8 and 9 is housed in the jack housing of FIGS. 6 and 7 and the jack housing coaxially received and rotatably engaged with the cover of FIGS. 4 and 5 to form the telephone wall jack of FIGS. 1, 2 and 3.

Combination of elements 36 and 30 comprise the jack housing, element 36 being the bottom portion and element 30 being the top. Bottom portion 36 fits into and is received by top portion 30 as shown in FIG. 10. Bottom portion 36 is comprised of base 40 in which there is a hole 29, through which the inside telephone wiring is passed (not shown) and terminated (not shown) on terminals 21. Shown by element 29 are holes for mounting screws (not shown). Insulated electrical conductors 24 connect to terminals 21, are passed through hole 29 and are in electrical contact with the metal tangs (not shown) of dielectric carrier 22. Insulated conductors 24 terminate at terminals 21 on base 40 and dielectric carrier 22 is slidably engaged between engaging means 26. Combination of dielectric carrier 16 and housing 25 forms cavity 16 in which the modular connector is inserted. Housing 25 is composed of two side walls connected together by a top portion, the side walls being in mechanical sliding engagement with dielectric carrier 22 in a matter well known in the art.

FIG. 10 is an exploded view of the elements of the invention, namely dust cover 41, jack housing bottom 36, jack housing cover 30, spring 31, screw 35 and cover means 10. Side wall 7 has an inner surface 7' and outer surface 7. As previously explained, spring 33 is slidably and coaxially engaged on post 19, with terminal portion 43 in cavity 20 and terminal portion 32 within cavities 13 and 14. Jack housing bottom 36 fits within side wall 37 of jack housing cover 30. Screw 35 fits through hole 23 and into threaded hole 44, to secure jack housing cover 30 to cover means 10 in a rotatable manner. It will be noted that element 30 is coaxially received inside of and attached to cover means 10. Biasing means 31 is engaged in the manner as previously described. Jack housing bottom 36 is mechanically fitted into the cavity delimited by side walls 37.

Element 41 is a dust cover, mechanically secured to the bottom portion of side 40 of jack housing bottom 36 within side walls 39. This cover protects dielectric carrier 22 from the outside elements such as dirt, grease, grime and the like.

The foregoing describes a shielded telephone wall jack, the unique construction of which achieves the objectives of shielding from mop water, dirt, grease and grime from the point where an electrical connection is made between the wall jack itself and a modular plug attached to a telephone handset. Only when cover means 10 is rotated in the manner indicated by the arrows associated with the word "open" as shown in FIGS. 1, 2 and 3, can the cavity, in which the plug or modular connector be inserted, is exposed. After a modular connector is inserted into the exposed cavity, the cover means is released and the bias spring causes the cover means to rotate in the manner opposite from that shown by the arrows to the extent that the previously exposed cavity is, for practical purposes, closed to the outside, thereby preventing undesirable exposure of the actual contact between the tangs of the dielectric carrier and the contact points of the modular connector.

What is claimed is:

1. A telephone wall jack comprising:
   (a) a cylindrically shaped cover means and a cylindrically shaped jack housing coaxially received in, rotatably engaged with and circumscribed by the cover means, said cover means and jack housing each being comprised of a top portion and an upstanding sidewall around the periphery thereof, each sidewall having an opening therein adapted to be rotatably aligned in mating relationship;
   (b) a jack in said jack housing in alignment with the opening of the upstanding sidewall of the jack housing; and,
   (c) a biasing means, one portion of which is in engagement with the cover means and another portion in engagement with the jack housing.

2. A telephone wall jack as described in claim 1 wherein the cover means includes a top portion and said top portion has a cavity on its undersurface.

3. A telephone wall jack as described in claim 2 wherein the jack housing comprises a top portion, and said top portion has a cavity in its outer surface.

4. A telephone wall jack as described in claim 3 wherein a portion of the biasing means is received in the cavity in the cover means top and another portion is received in the cavity in the jack housing top portion.

5. A telephone wall jack as described in claim 3 including an upstanding stop means disposed on the undersurface of the cover means top portion and a slot in the top portion of the jack housing, said stop means being slidably disposed in said slot.

6. A telephone wall jack as described in claim 2 wherein the cavity in the cover means top comprises:
(a) an upstanding center post; and,
(b) an upstanding wall spaced apart from and partially circumscribing the center post, the terminal portions of said wall being spaced apart from one another.

7. A telphone wall jack as described in claim 6 wherein the cavity in the top portion of the jack housing comprises:
(a) a first portion;
(b) a second portion smaller than and coaxially disposed with the first portion; and,
(c) a third portion in communication with the last-mentioned portion and tangential thereto.

8. A telephone wall jack as described in claim 7 wherein the biasing means is a spring having two terminal portions and a medial portion, one of said terminal portions being disposed in the cavity of the cover means top, the medial portion being partly disposed around the cover means center post and in the first and second portions of the cavity in the jack housing top and the other terminal portion being disposed in the third portion of said last mentioned cavity.

9. A telephone wall jack as described in claim 1 wherein the cover means includes a top portion and an upstanding sidewall around the periphery thereof and where said side wall contains a first opening adapted to expose the jack of the jack housing if aligned therewith and a second opening in communication with the first opening, the second opening being smaller than the first opening.

10. A telephone wall jack as described in claim 1 wherein said jack housing is composed of a top and bottom portion, said bottom portion containing a jack cavity composed in part by a dielectric carrier containing insulated electrical connectors having contact surfaces on a terminal portion thereof.

11. A telephone wall jack as described in claim 1 wherein said jack housing includes a top portion, said top portion comprising a top, an upstanding side wall disposed around the periphery thereof, an opening in said side wall, a flange portion adjacent to said opening and a notch in said flange portion.

* * * * *